E. MIRE.
Corn Mill.
No. 29,509. Patented Aug. 7, 1860.
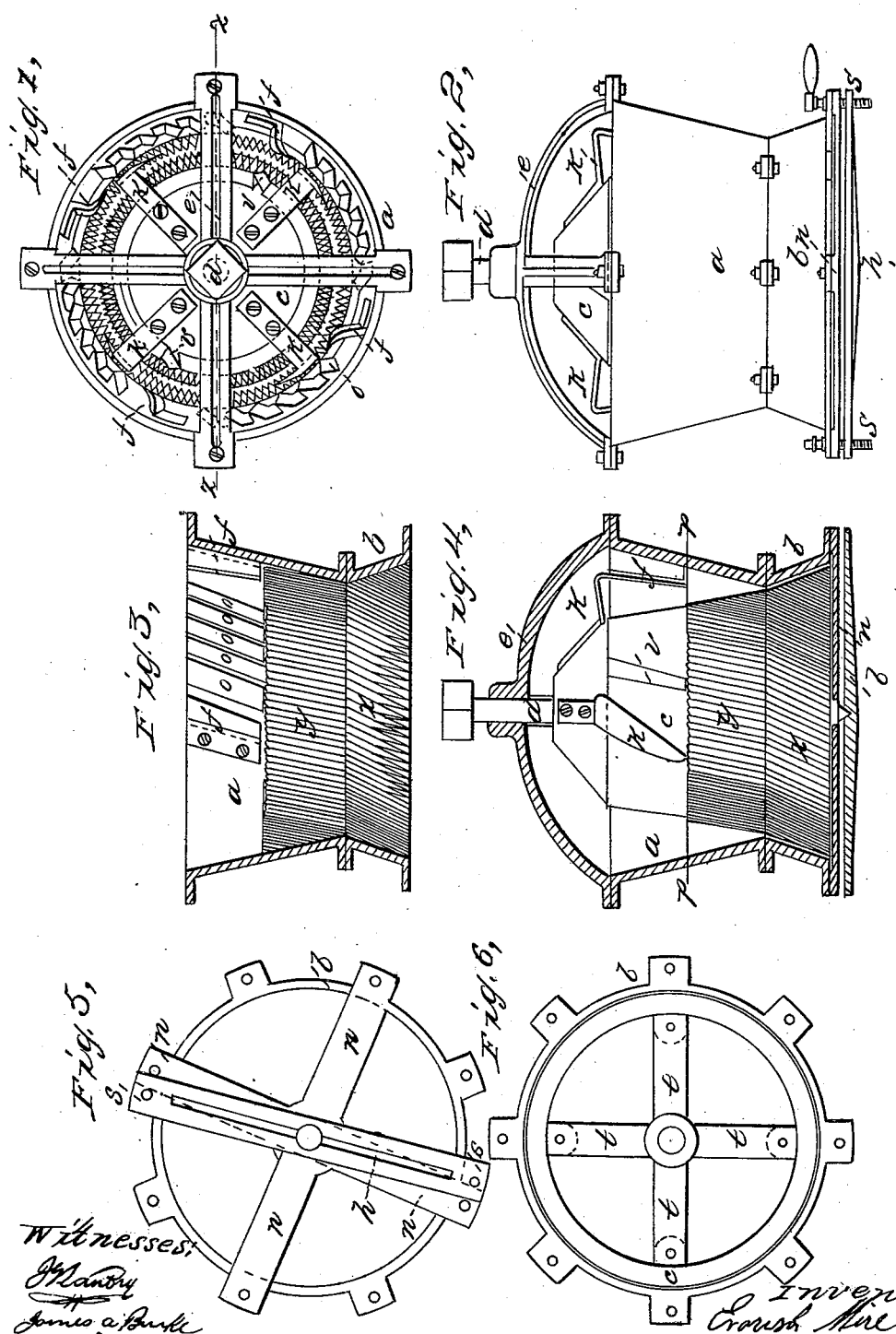

UNITED STATES PATENT OFFICE.

EVARISTE MIRE, OF NEW ORLEANS, LOUISIANA.

MILL FOR CUTTING AND GRINDING THE CORN, COB, AND HUSK TOGETHER.

Specification of Letters Patent No. 29,509, dated August 7, 1860.

*To all whom it may concern:*

Be it known that I, EVARISTE MIRE, of the city of New Orleans and State of Louisiana, have made a new and useful Improvement in Corn-Mills; and I hereby declare that the following is a full, clear, and exact description thereof, reference being had to the accompanying drawings and to the letters of reference marked thereon, making a part of this specification, the same letters being used to designate the same parts shown in the following figures, in which—

Figure 1 is a top view. Fig. 2 is a side elevation. Fig. 3 is a sectional view of a part, namely, the outer shell, or body of the mill, designated by letters, $a$, and, $b$, and as seen from line, $z$, in Fig. 1. Fig. 4 is in part sectional, and as seen from the same line as Fig. 3, having the runner, $c$, shown in full. Figs. 5, and 6, will be used as reference views in the further describing.

The object of this improvement is to facilitate the grinding of ears of corn having the husks on; and thus render the whole a suitable article of food for animals, in being ground into coarse meal, the principal feature being in the arrangement to so act on the husks, as to first cut them into particles, and in the same action force them downward, so they can pass through the mill with the other particles, and come out an uniformly mixed article.

The husks of corn being a light substance has a tendency to fly upward, caused by the motion of the runner; and when so, are not ground with the balance of the ear, but materially interfere with the feeding. The grinding of the husks, or otherwise cutting them into atoms, with the balance of the ear, enhances the value of the food, in making it a light nutritious substance.

Some parts of this mill are made as, or substantially as numerous other grinding mills, constructed of cast iron, and which I will designate as located, below line, P, in Fig. 4; also the frame marked, $e$, mounted on the mill, and making the center for the spindle, $d$, to move in. The part that contains my improvement is placed between line, P, and frame, $e$, and mounted on the runner, $c$, and the upper part of shell, $a$.

The construction of the mill as a whole, consists in the shell or outer parts, $a$, and, $b$, being made as set forth in two parts, and joined by bolts as seen in Fig. 2,—having a cross frame, $n$, below, $b$, as seen in Fig. 5, through which the spindle, $d$, passes, and below this, the bar, $h$, crosses the base, making the step for the spindle to move in. The screws, $s$, $s$, are used for regulating the character of the grinding. The runner, $c$, is also made of two parts, and joined at the same cross line, as, $a$, and, $b$, are joined. On the top of the lower part of, $c$, (see Fig. 6) is a cross frame, $t$, through which the spindle passes, and is made fast to the lower part of the runner. The upper part having projecting lugs extending inward, which is bolted to frame, $t$, and thus unite them.

The cutting teeth on both, $a$, and, $b$, also those on, $c$, marked, $y$, and, $x$, are made similar to others used for grinding corn in this character of grinding mills. Those marked, $y$, are coarser than those of, $x$, in order to act on and prepare the substance to be ground by the latter. These teeth as seen by Figs. 3 and 4, are set angular, and in the passing each other present their edges in cutting like those of shears, the runner moving in the direction of the arrows, as seen by Fig. 1. The spindle, $d$, has a square head, over which a socket of the driving shaft passes, in order to bring such power used in connection.

On the runner, $c$, I mount four knives marked, K, set at equal distance apart (see Fig. 1), and in shell, $a$, I mount four other knives marked, $f$, also set at equal distance apart. These knives are made of wrought iron, having steel edges, ground sharp; they must be made substantial, and carefully adjusted. They are so placed (see Figs. 3 and 4), to have the upper part of their edges to pass first, that in their cutting they act as shears, and sweep the substance they have cut downward—namely, the husks—and throw them between the teeth, $y$, on the runner, and in the shell, to insure their continuation through the mill with the grains and the cobs. The knives are not required to touch each other at the upper parts of the blades, but nearly so. The first requisition of the knives is to break up the cobs, and otherwise separate the ear, so the knives can finish the cutting in the downward passage. In the shell, $a$, and above line, P, I place segments, on which are large teeth set in angular positions corresponding to knives, $f$, seen in Figs. 1, and 3, marked, $o$,—each knife has a segment set directly before it. The teeth on these segments by the force of knives, K, and in being so formed, prevent the husks from coming up, and between them are conducting chutes for them to be forced downward. On the runner, c, I place two large teeth, situated one on either side (see Figs. 1 and 4, marked, v). These are also set angular, and in a reverse position from the teeth, o, on the segments; these have also a tendency to force the husks down, and throw them in position so the knives can cut them.

What I claim as new and desire to secure by Letters Patent, is—

The combination of the knives K and f, when used in conjunction with the teeth, o, and, v, arranged and operated as, or substantially as, and for the purpose set forth.

EVARISTE MIRE.

Witnesses:
JAMES A. BURKE,
J. T. LANDCY.